United States Patent
Tang et al.

(10) Patent No.: US 11,113,817 B2
(45) Date of Patent: Sep. 7, 2021

(54) SYSTEM AND METHOD FOR IDENTIFYING TARGET REGIONS PRIOR TO ORGANS AT RISK SEGMENTATION

(71) Applicant: TENCENT AMERICA LLC, Palo Alto, CA (US)

(72) Inventors: Hui Tang, Mountain View, CA (US); Lianyi Han, Palo Alto, CA (US); Min Tu, Cupertino, CA (US); Kun Wang, San Jose, CA (US); Chao Huang, Palo Alto, CA (US); Zhen Qian, Santa Clara, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 36 days.

(21) Appl. No.: 16/531,719

(22) Filed: Aug. 5, 2019

(65) Prior Publication Data
US 2021/0042932 A1 Feb. 11, 2021

(51) Int. Cl.
*G06T 7/11* (2017.01)
*G06T 7/00* (2017.01)
*G06T 7/174* (2017.01)
*G06T 15/08* (2011.01)

(52) U.S. Cl.
CPC ............ *G06T 7/11* (2017.01); *G06T 7/0012* (2013.01); *G06T 7/174* (2017.01); *G06T 15/08* (2013.01); *G06T 2207/10081* (2013.01); *G06T 2207/20084* (2013.01); *G06T 2207/20132* (2013.01); *G06T 2207/30196* (2013.01)

(58) Field of Classification Search
CPC ......... G06T 7/11; G06T 7/174; G06T 7/0012; G06T 15/08; G06T 2207/10081; G06T 2207/20084; G06T 2207/20132; G06T 2207/30196; A61B 6/032; A61B 5/055; A61B 34/10; G16H 30/40
See application file for complete search history.

(56) References Cited

U.S. PATENT DOCUMENTS

2011/0153547 A1 6/2011 McNutt et al.
2018/0315188 A1* 11/2018 Tegzes .................. G06T 7/11

OTHER PUBLICATIONS

International Search Report in International Application No. PCT/US2020/044440 dated Oct. 16, 2020.
(Continued)

*Primary Examiner* — Vu Le
*Assistant Examiner* — Julius Chenjun Chai
(74) *Attorney, Agent, or Firm* — Sughrue Mion, PLLC

(57) ABSTRACT

A method and device for generating a three dimensional (3D) bounding box of a region of interest (ROI) of a patient include receiving a two dimensional (2D) maximum intensity projection (MIP) image that is an axial view of the patient and a 2D MIP image that is a sagittal view of the patient. A first 2D bounding box of the ROI of the patient and a second 2D bounding box of the ROI of the patient are detected using the 2D MIP images. A 3D MIP image of the patient is received, and the 3D bounding box of the ROI of the patient is generated using the 3D MIP image, the first 2D bounding box, and the second 2D bounding box. The 3D MIP image including the 3D bounding box is provided.

17 Claims, 3 Drawing Sheets

(56) References Cited

OTHER PUBLICATIONS

Written Opinion of the International Searching Authority in International Application No. PCT/US2020/044440 dated Oct. 16, 2020.
Saeedeh Afshari, "Deep Learning for Quantitative Image Analysis of Positron Emission Tomography.", Diss. Applied Sciences: School of Computing Science, Mar. 5, 2019 (47 pages total).
L. Santiago Medina, "Three-dimensional CT maximum intensity projections of the calvaria: a new approach for diagnosis of craniosynostosis and fractures." American Journal of Neuroradiology, Dec. 2000, vol. 21, pp. 1951-1954 (4 pages total).
Yueyue Wang et al., "Organ at risk segmentation in head and neck CT images using a two-stage segmentation framework based on 3D U-Net." IEEE Access, vol. XX Feb. 2017, pp. 1-11 (11 pages total).
Jayashree Kalpathy-Cramer et al., "Development of a software for quantitative evaluation radiotherapy target and organ-at-risk segmentation comparison." Journal of Digital Imaging, Sep. 17, 2013, vol. 27, pp. 108-119 (12 pages total).
Gregory Sharp et al., "Vision 20/20: perspectives on automated image segmentation for radiotherapy.", Medical Physics, Apr. 24, 2014, vol. 41, No. 5, pp. 050902-1-050902-13 (13 pages total).

\* cited by examiner

SYSTEM AND METHOD FOR IDENTIFYING TARGET REGIONS PRIOR TO ORGANS AT RISK SEGMENTATION

BACKGROUND

Automated organ at risk (OAR) segmentation has been a popular research topic since manual segmentation is time consuming and operator-dependent. Recent developments in deep learning have reduced the amount of time for segmentation tasks to the order of milliseconds.

However, due to limits of graphics processing unit (GPU) memory, it is often impractical to feed a large amount of three dimensional (3D) volume data with original sizing into a segmentation network. To solve this problem, some techniques utilize cropping, sliding windows, or downsampling as preprocessing steps. Downsampling might remove high frequency information of the input image, and as a result reduces the following segmentation accuracy. Manual cropping introduces human interaction and is inefficient. Sliding window ensemble methods may improve segmentation accuracy slightly, but is more time-consuming in the inference stage.

This present disclosure efficiently detects the bounding box of the head and neck, narrows the input to the region of interest, and saves GPU memory resources while maintaining image detail.

SUMMARY

According to an aspect of the disclosure, a method for generating a three dimensional (3D) bounding box of a region of interest (ROI) of a patient, includes receiving, by a device, a two dimensional (2D) maximum intensity projection (MIP) image that is an axial view of the patient; receiving, by the device, a 2D MIP image that is a sagittal view of the patient; detecting, by the device, a first 2D bounding box of the ROI of the patient using the 2D MIP image that is the axial view of the patient; detecting, by the device, a second 2D bounding box of the ROI of the patient using the 2D MIP image that is the sagittal view of the patient; receiving, by the device, a 3D MIP image of the patient; generating, by the device, the 3D bounding box of the ROI of the patient using the first 2D bounding box, the second 2D bounding box, and the 3D MIP image of the patient; and providing, by the device, the 3D MIP image including the 3D bounding box of the ROI of the patient to permit organ at risk (OAR) segmentation using the 3D MIP image including the 3D bounding box of the ROI.

According to an aspect of the disclosure, a device for generating a three dimensional (3D) bounding box of a region of interest (ROI) of a patient comprises at least one memory configured to store program code; and at least one processor configured to read the program code and operate as instructed by the program code, the program code including: receiving code that is configured to cause the at least one processor to receive a two dimensional (2D) maximum intensity projection (MIP) image that is an axial view of the patient, receive a 2D MIP image that is a sagittal view of the patient, and receive a 3D MIP image of the patient; detecting code that is configured to cause the at least one processor to detect a first 2D bounding box of the ROI of the patient using the 2D MIP image that is the axial view of the patient, and detect a second 2D bounding box of the ROI of the patient using the 2D MIP image that is the sagittal view of the patient; generating code that is configured to cause the at least one processor to generate the 3D bounding box of the ROI of the patient using the first 2D bounding box, the second 2D bounding box, and the 3D MIP image of the patient; and providing code that is configured to cause the at least one processor to provide the 3D MIP image including the 3D bounding box of the ROI of the patient to permit organ at risk (OAR) segmentation using the 3D MIP image including the 3D bounding box of the ROI.

According to an aspect of the disclosure, a non-transitory computer-readable medium stores instructions, the instructions comprising: one or more instructions that, when executed by one or more processors of a device, cause the one or more processors to: receive a two dimensional (2D) maximum intensity projection (MIP) image that is an axial view of the patient; receive a 2D MIP image that is a sagittal view of the patient; detect a first 2D bounding box of the ROI of the patient using the 2D MIP image that is the axial view of the patient; detect a second 2D bounding box of the ROI of the patient using the 2D MIP image that is the sagittal view of the patient; receive a 3D MIP image of the patient; generate the 3D bounding box of the ROI of the patient using the first 2D bounding box, the second 2D bounding box, and the 3D MIP image of the patient; and provide the 3D MIP image including the 3D bounding box of the ROI of the patient to permit organ at risk (OAR) segmentation using the 3D MIP image including the 3D bounding box of the ROI.

DETAILED DESCRIPTION

Figure 1:
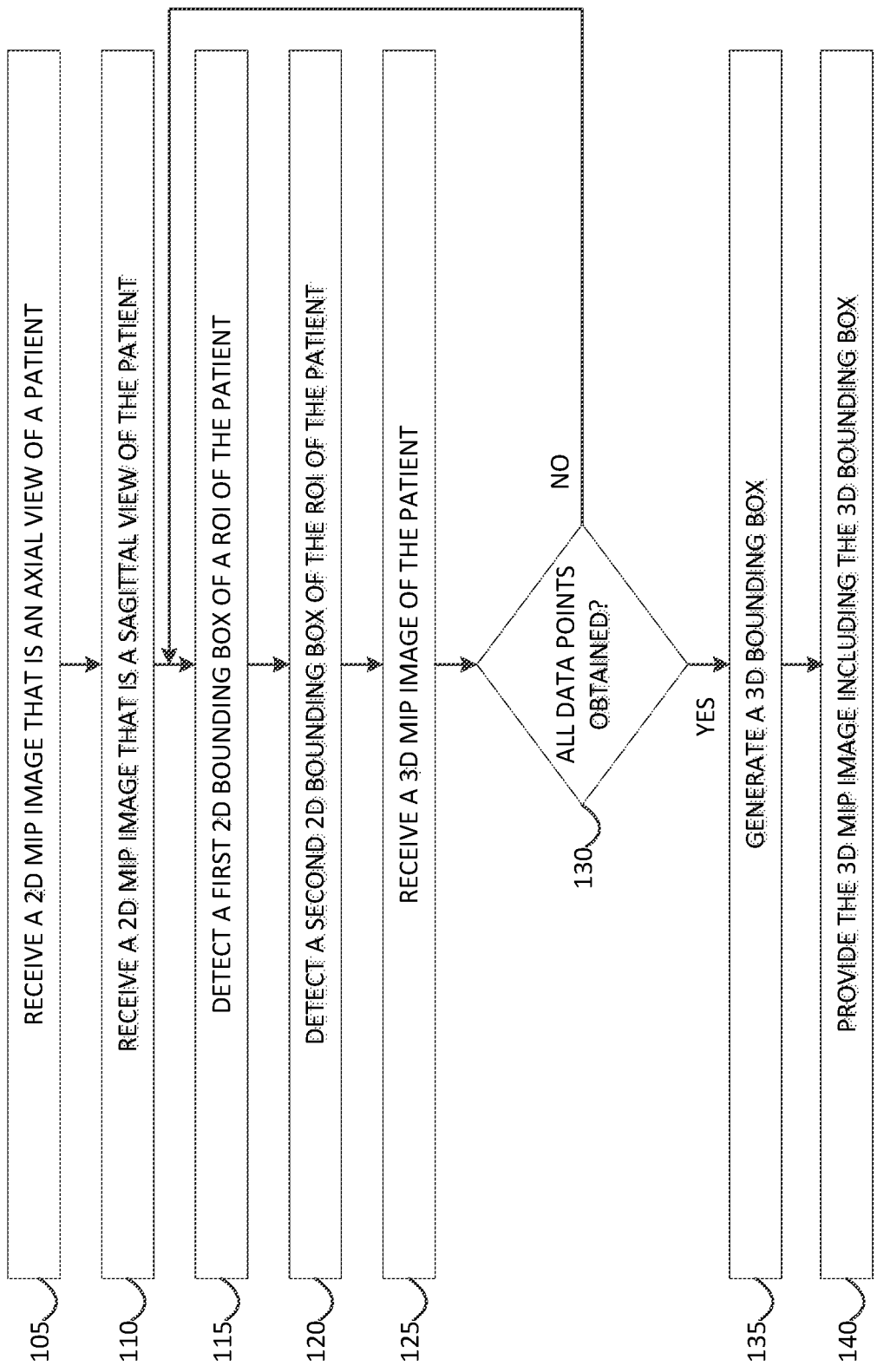
FIG. 1 is a flow chart of an example process for generating a three dimensional (3D) bounding box of a region of interest (ROI) of a patient using two dimensional (2D) image data.

Deep learning (DL) based segmentation networks have been widely used for the border delineation of organs at risk (OAR) and targeted tumors in treatment planning of radiotherapy. However, 3D based segmentation networks often suffer from limited GPU memory resources if the input image volumes are of original size (e.g., include a file size above a particular predetermined threshold).

The present disclosure addresses this problem in 3D OAR segmentation by automatically detecting a bounding box of a body part of interest prior to the DL based segmentation step. The OAR segmentation is performed within the detected bounding box in order to reduce resource consumption. To reduce the memory requirement of the bounding box detection network, the an embodiment of the present disclosure detects two dimensional (2D) bounding boxes using 2D maximum intensity projection images derived from the saggital and axial views rather than using the original 3D image. The 3D bounding box is then constructed from the 2D bounding boxes in the 2D maximum intensity projection (MIP) images.

An embodiment of the present disclosure automatically detects regions of interest (ROIs) from the human body (e.g., the head and neck area of computed tomography (CT) images scanned for patients with head and neck cancer).

An embodiment of the present disclosure performs detection using 2D MIP projection images instead of 3D images, thus conserving GPU memory and processing resources as compared to using 3D images for bounding box detection. After identifying the bounding box of the head and neck area, an embodiment of the present disclosure narrows the input volume to the head and neck area of interest. Therefore, an embodiment of the present disclosure addresses the GPU memory limitation problem in the following segmentation stage as well.

As a particular example, the present disclosure provides an efficient way of ROI detection (e.g., head and neck) in CT images from patients with head and neck cancer. For example, an embodiment detects the bounding box of the head and neck using 2D projection images, and thus saves memory in the bounding box detection stage as compared to performing detection using 3D image data directly. This is beneficial for deep learning based OAR segmentation if the input volume of the segmentation is the detected head and neck rather than the whole volume including, for example, data associated with a bed.

Detecting a 3D bounding box requires more GPU memory consumption as compared to detecting a 2D bounding box. Accordingly, an embodiment of the present disclosure detects the bounding boxes using 2D MIP images.

An embodiment of the disclosure may utilize a fast region based convolutional neural network (RCNN), a faster RCNN, a mask RCNN, or the like, for 2D deep learning based bounding box detection.

For instance, in a faster RCNN architecture, an input image is sent to a convolutional network to extract a feature map. The feature map is then sent to a region proposal network to predict candidate regions. The size of the proposed regions are further reshaped and sent to a classifier which classifies the information in the proposed regions, and predicts the actual shape of the proposed region.

In the present disclosure, an embodiment includes two classes in each proposed region (i.e., the axial and the sagittal MIP). Regarding the region size, an embodiment may predict four coordinates of minimum x, minimum y, maximum x and maximum y for each proposed region.

According to an embodiment, the 3D bounding box might include six coordinates, such as minimum x, maximum x, minimum y, maximum y, minimum z, and maximum z. The first four coordinates (i.e., minimum x, maximum x, minimum y, and maximum y) are determined based on the coordinates in the axial MIP images. Further, the remaining coordinates (i.e., the minimum z and maximum z) are determined based on the minimum x and maximum x in the sagittal image.

The present disclosure provides, among other things, the following technical benefits: 1) reduced GPU memory footprint that permits ROI recognition possible and viable; and 2) improved workflow and efficiency.

FIG. 1 is a flow chart of an example process 100 for generating a three dimensional (3D) bounding box of a region of interest (ROI) of a patient. In some implementations, one or more process blocks of FIG. 1 may be performed by platform 220. In some implementations, one or more process blocks of FIG. 1 may be performed by another device or a group of devices separate from or including platform 220, such as user device 210.

As shown in FIG. 1, process 100 may include receiving, by a device, a two dimensional (2D) maximum intensity projection (MIP) image that is an axial view of the patient (block 105).

For example, platform 220 may receive a 2D MIP image that is an axial view of a patient. The platform 220 may receive the 2D MIP image from another device, based on an input from an operator, from a cloud storage device, or the like.

The patient may refer to a person, an animal, a phantom, and object, or the like, for which an ROI is to be detected. The ROI may refer to a region for which organ at risk (OAR) processing is to be performed. As an example, for a patient with head and neck cancer, the ROI may include a head and neck of the patient. It should be understood that the ROI may vary based on the patient. The axial view of the patient may refer to a plan view of the patient.

As further shown in FIG. 1, process 100 may include receiving, by the device, a 2D MIP image that is a sagittal view of the patient (block 110).

As further shown in FIG. 1, process 100 may include detecting, by the device, a first 2D bounding box of the ROI of the patient using the 2D MIP image that is the axial view of the patient (block 115).

As further shown in FIG. 1, process 100 may include detecting, by the device, a second 2D bounding box of the ROI of the patient using the 2D MIP image that is the sagittal view of the patient (block 120).

As further shown in FIG. 1, process 100 may include receiving, by the device, a 3D MIP image of the patient (block 125).

As further shown in FIG. 1, process 100 may include identifying whether all data points of the first 2D bounding box and the second 2D bounding box have been obtained (block 130).

As further shown in FIG. 1, if all of the data points have not been obtained (block 130—NO), then process 100 may include obtaining additional data points.

As further shown in FIG. 1, if all of the data points have been obtained (block 130—YES), then process 100 may include generating, by the device, the 3D bounding box of the ROI of the patient using the first 2D bounding box, the second 2D bounding box, and the 3D MIP image of the patient (block 135).

As further shown in FIG. 1, process 100 may include providing, by the device, the 3D MIP image including the 3D bounding box of the ROI of the patient to permit organ at risk (OAR) segmentation using the 3D MIP image including the 3D bounding box of the ROI (140).

Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

Figure 2:
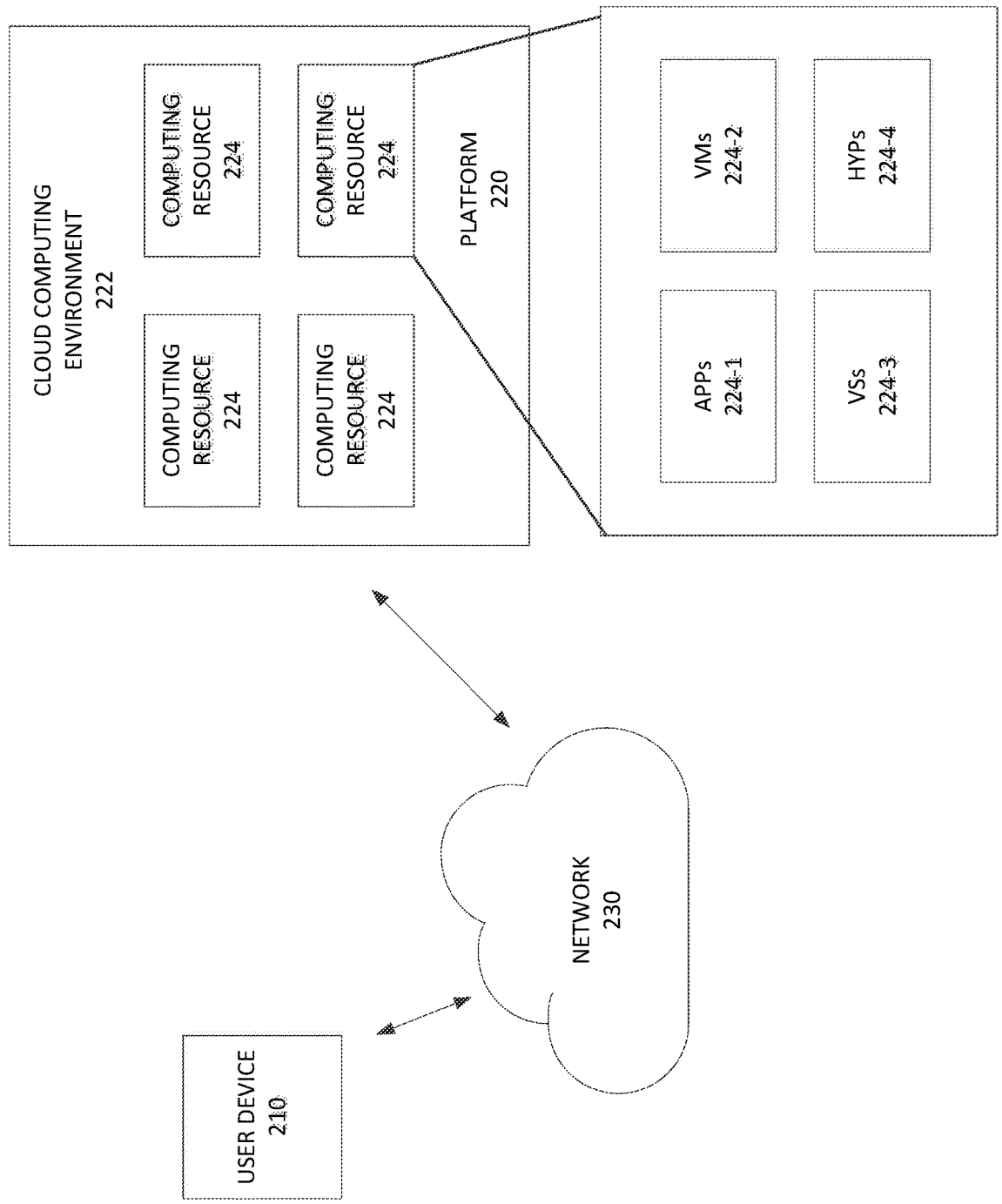
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of generating a three dimensional (3D) bounding box of a region of interest (ROI) of a patient, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
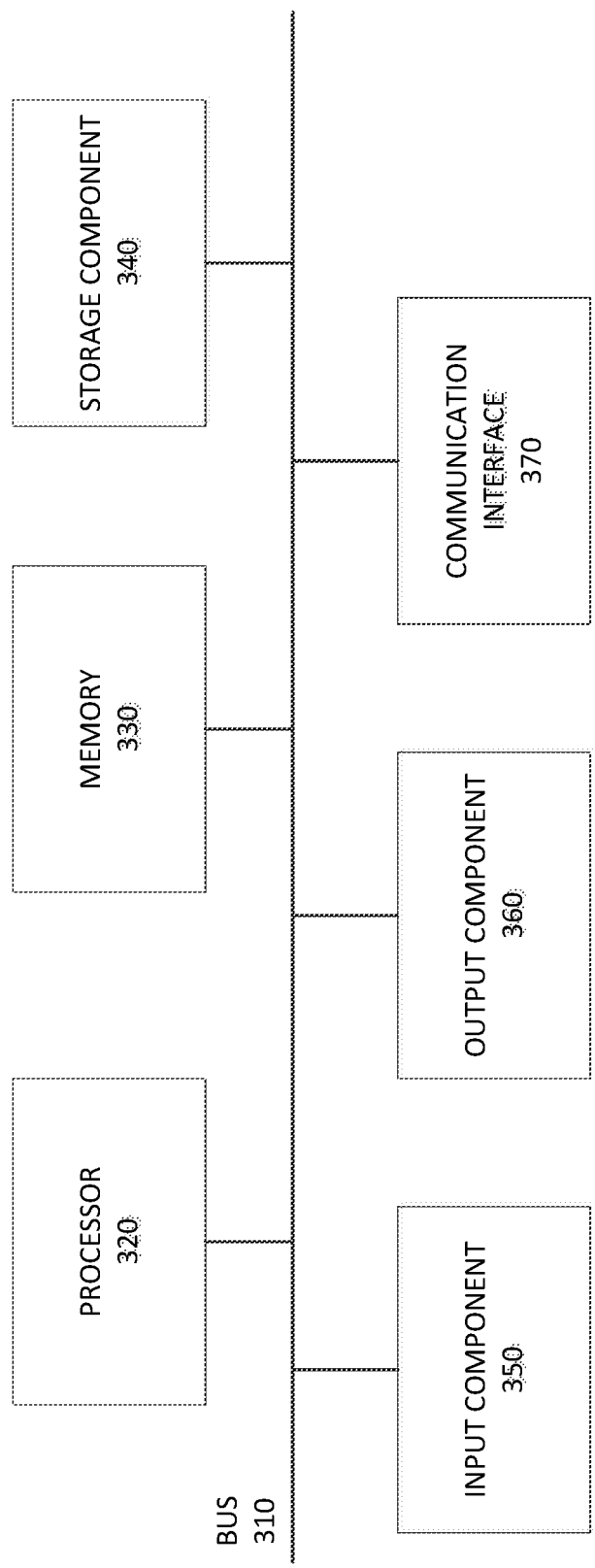
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for generating a three dimensional (3D) bounding box of a region of interest (ROI) of a patient, comprising:
   receiving, by a device, a two dimensional (2D) maximum intensity projection (MIP) image that is an axial view of the patient;
   receiving, by the device, a 2D MIP image that is a sagittal view of the patient;
   detecting, by the device, a first 2D bounding box of the ROI of the patient using the 2D MIP image that is the axial view of the patient;
   detecting, by the device, a second 2D bounding box of the ROI of the patient using the 2D MIP image that is the sagittal view of the patient;
   receiving, by the device, a 3D MIP image of the patient;
   generating, by the device, the 3D bounding box of the ROI of the patient using only the first 2D bounding box, the second 2D bounding box, and the 3D MIP image of the patient;
   removing, by the device, data of the 3D MIP image that is not within the 3D bounding box, prior to performing organ at risk (OAR) segmentation; and
   providing, by the device, the 3D MIP image including the 3D bounding box of the ROI of the patient and from which the data has been removed to permit the OAR segmentation using the 3D MIP image including the 3D bounding box of the ROI and from which the data has been removed.

2. The method of claim 1, further comprising:
inputting, by the device, the 2D MIP image that is the axial view of the patient, and the 2D MIP image that is the sagittal view of the patient into a region based convolutional neural network (RCNN); and
detecting, by the device, the first 2D bounding box and the second 2D bounding box based on an output of the RCNN.

3. The method of claim 1, further comprising:
identifying, by the device, a first minimum horizontal value, a first maximum horizontal value, a first minimum vertical value, and a first maximum vertical value of the first 2D bounding box of the ROI.

4. The method of claim 3, further comprising:
identifying, by the device, a second minimum horizontal value and a second maximum horizontal value of the second 2D bounding box of the ROI.

5. The method of claim 4, further comprising:
generating, by the device, the 3D bounding box of the ROI using the first minimum horizontal value, the first maximum horizontal value, the first minimum vertical value, and the first maximum vertical value of the first 2D bounding box of the ROI, and using the second minimum horizontal value and the second maximum horizontal value of the second 2D bounding box of the ROI.

6. The method of claim 1, wherein the ROI is a head of the patient.

7. A device for generating a three dimensional (3D) bounding box of a region of interest (ROI) of a patient, comprising:
at least one memory configured to store program code;
at least one processor configured to read the program code and operate as instructed by the program code, the program code including:
receiving code that is configured to cause the at least one processor to receive a two dimensional (2D) maximum intensity projection (MIP) image that is an axial view of the patient, receive a 2D MIP image that is a sagittal view of the patient, and receive a 3D MIP image of the patient;
detecting code that is configured to cause the at least one processor to detect a first 2D bounding box of the ROI of the patient using the 2D MIP image that is the axial view of the patient, and detect a second 2D bounding box of the ROI of the patient using the 2D MIP image that is the sagittal view of the patient;
generating code that is configured to cause the at least one processor to generate the 3D bounding box of the ROI of the patient using only the first 2D bounding box, the second 2D bounding box, and the 3D MIP image of the patient;
removing code that is configured to cause the at least one processor to remove data of the 3D MIP image that is not within the 3D bounding box, prior to performing organ at risk (OAR) segmentation; and
providing code that is configured to cause the at least one processor to provide the 3D MIP image including the 3D bounding box of the ROI of the patient and from which the data has been removed to permit organ the OAR segmentation using the 3D MIP image including the 3D bounding box of the ROI and from which the data has been removed.

8. The device of claim 7, further comprising:
inputting code that is configured to cause the at least one processor to input the 2D MIP image that is the axial view of the patient, and the 2D MIP image that is the sagittal view of the patient into a region based convolutional neural network (RCNN), and
wherein the detecting code is further configured to cause the at least one processor to detect the first 2D bounding box and the second 2D bounding box based on an output of the RCNN.

9. The device of claim 7, further comprising:
identifying code that is further configured to cause the at least one processor to identify a first minimum horizontal value, a first maximum horizontal value, a first minimum vertical value, and a first maximum vertical value of the first 2D bounding box of the ROI.

10. The device of claim 9, wherein the identifying code is further configured to cause the at least one processor to identify a second minimum horizontal value and a second maximum horizontal value of the second 2D bounding box of the ROI.

11. The device of claim 10, wherein the generating code is further configured to cause the at least one processor to generate the 3D bounding box of the ROI using the first minimum horizontal value, the first maximum horizontal value, the first minimum vertical value, and the first maximum vertical value of the first 2D bounding box of the ROI, and using the second minimum horizontal value and the second maximum horizontal value of the second 2D bounding box of the ROI.

12. The device of claim 7, wherein the ROI is a head of the patient.

13. A non-transitory computer-readable medium storing instructions, the instructions comprising: one or more instructions that, when executed by one or more processors of a device for generating a three dimensional (3D) bounding box of a region of interest (ROI) of a patient, cause the one or more processors to:
receive a two dimensional (2D) maximum intensity projection (MIP) image that is an axial view of the patient;
receive a 2D MIP image that is a sagittal view of the patient;
detect a first 2D bounding box of the ROI of the patient using the 2D MIP image that is the axial view of the patient;
detect a second 2D bounding box of the ROI of the patient using the 2D MIP image that is the sagittal view of the patient;
receive a 3D MIP image of the patient;
generate the 3D bounding box of the ROI of the patient using only the first 2D bounding box, the second 2D bounding box, and the 3D MIP image of the patient;
remove data of the 3D MIP image that is not within the 3D bounding box, prior to performing organ at risk (OAR) segmentation; and
provide the 3D MIP image including the 3D bounding box of the ROI of the patient and from which the data has been removed to permit organ the OAR segmentation using the 3D MIP image including the 3D bounding box of the ROI and from which the data has been removed.

14. The non-transitory computer-readable medium of claim 13, wherein the one or more instructions cause the one or more processors to:
input the 2D MIP image that is the axial view of the patient, and the 2D MIP image that is the sagittal view of the patient into a region based convolutional neural network (RCNN); and detect the first 2D bounding box and the second 2D bounding box based on an output of the RCNN.

15. The non-transitory computer-readable medium of claim 13, wherein the one or more instructions cause the one or more processors to:
   Identify a first minimum horizontal value, a first maximum horizontal value, a first minimum vertical value, and a first maximum vertical value of the first 2D bounding box of the ROI.

16. The non-transitory computer-readable medium of claim 15, wherein the one or more instructions cause the one or more processors to:
   identify a second minimum horizontal value and a second maximum horizontal value of the second 2D bounding box of the ROI.

17. The non-transitory computer-readable medium of claim 16, wherein the one or more instructions cause the one or more processors to:
   generate the 3D bounding box of the ROI using the first minimum horizontal value, the first maximum horizontal value, the first minimum vertical value, and the first maximum vertical value of the first 2D bounding box of the ROI, and using the second minimum horizontal value and the second maximum horizontal value of the second 2D bounding box of the ROI.

\* \* \* \* \*